(12) United States Patent
Durfee, Jr.

(10) Patent No.: US 6,619,895 B1
(45) Date of Patent: Sep. 16, 2003

(54) MACHINE SPINDLE ACTUATING INDEXING UNIT

(76) Inventor: David L. Durfee, Jr., 16974 Brookside Dr., Apt. 303, Meadville, PA (US) 16335

( * ) Notice: Subject to any disclaimer, the term of this patent is extended or adjusted under 35 U.S.C. 154(b) by 85 days.

(21) Appl. No.: 09/587,979

(22) Filed: Jun. 6, 2000

(51) Int. Cl.$^7$ .................................................. B23Q 3/00
(52) U.S. Cl. ....................... 409/221; 74/813 L; 408/89; 409/198
(58) Field of Search ................................. 409/164, 198, 409/221, 224, 903; 408/71, 89, 91, 109; 269/63, 81; 74/813 L, 816

(56) References Cited

U.S. PATENT DOCUMENTS

| | | | | |
|---|---|---|---|---|
| 1,737,002 A | * | 11/1929 | De Vlieg | 409/221 |
| 1,756,831 A | * | 4/1930 | Marsilius | 409/198 |
| 2,484,758 A | * | 10/1949 | Sonnie | 409/221 |
| 3,790,153 A | * | 2/1974 | Seidenfaden | 269/296 |
| 3,953,918 A | | 5/1976 | Boone et al. | 29/568 |
| 4,159,658 A | * | 7/1979 | Parkinson | 74/826 |
| 4,353,271 A | * | 10/1982 | Pieczulewski | 74/826 |
| 4,440,530 A | | 4/1984 | Yamakage | 408/3 |
| 4,617,720 A | * | 10/1986 | Palfery et al. | 409/221 |
| 5,111,573 A | | 5/1992 | Ito et al. | 483/1 |
| 5,243,745 A | | 9/1993 | Varnau | 29/33 P |
| 5,297,454 A | * | 3/1994 | Ito | 74/126 |
| 5,454,148 A | | 10/1995 | Ewer et al. | 23/33 J |
| 5,481,944 A | * | 1/1996 | Oketani et al. | 74/816 |
| 5,499,963 A | | 3/1996 | Fujimoto et al. | 483/56 |
| 5,716,310 A | | 2/1998 | Polacek et al. | 483/57 |
| 5,919,120 A | | 7/1999 | Pumphrey | 483/1 |

* cited by examiner

Primary Examiner—Daniel W. Howell
(74) Attorney, Agent, or Firm—Welsh & Flaxman LLC (57) ABSTRACT

The invention relates to a workpiece support assembly including an indexing unit adapted for the automated adjustment of a workpiece being machined. The assembly includes a central support column having at least one indexing unit secured thereto. The indexing unit includes a base member integrated with the central support column, a main body to which a workpiece may be selectively secured and a locking assembly permitting the selective locking and rotation of the main body relative to the base member. The main body is mounted on the base member for selective rotation required to rotate a workpiece as mounted.

17 Claims, 8 Drawing Sheets

MACHINE SPINDLE ACTUATING INDEXING UNIT

BACKGROUND OF THE INVENTION

1. Field of the Invention

The invention relates to an indexing assembly. More particularly, the invention relates to an indexing assembly used in conjunction with a machining apparatus to rotate/position a workpiece without removing the workpiece from the machining apparatus.

2. Description of the Prior Art

Downtime is the nemesis of virtually all machine shops. When machines are being adjusted, or when workpieces are being reoriented, the manufacturing process is placed on hold and productivity accordingly goes down. Many techniques, methods any apparatuses have, therefore, been developed to minimize downtime in manufacturing processes.

For example, tool changing assemblies have been developed for automatically changing working tools on a machining assembly without the need for human intervention. These tool changing assemblies have drastically reduced the downtime associated with complex manufacturing processes. In general, changing assemblies include a processing turret which supports a spindle to which a tool is selectively secured. The processing turret orients the tool for engagement with the workpiece such that the tool may act upon the workpiece in a desired manner. Additional tools are commonly stored within a tool transfer station. The tool transfer station selectively removes and replaces tools upon the spindle as the manufacturing process moves forward.

While the development of tool changing assemblies has substantially improved the efficient use of manufacturing equipment, substantial downtime remains a common problem. Further efficiency is provided by the provision of "tombstone" fixtures. These fixtures commonly support a plurality of workpieces upon a central support constructed for rotation about a longitudinal axis. As such, the workpieces are supported in such a manner that they may be successively positioned for processing by the machining assembly. The tombstone's ability to successively move the workpieces for treatment by the machine tool assembly, once again limits the need for human involvement during the manufacturing process and reduces undesirably downtime.

The combination of tool changing assemblies and tombstone fixtures has not, however, fully automated the manufacturing process and substantial downtime is still associated with high volume manufacturing operations. For example, known tombstone fixtures are designed to support workpieces in a fixed manner. These tombstones require that a human operator shutdown the machining apparatus when a workpiece must be reoriented for further processing. As with most adjustments requiring the shut down of a manufacturing process, the reorientation of the workpieces held on a tombstone fixture is highly time consuming, and accordingly highly undesirable. In addition, each time a workpiece is reoriented on the tombstone fixture accuracy is compromised. Such reductions in accuracy, even when minimal, are highly undesirable.

A need, therefore, exists for an apparatus permitting the ready adjustment of workpieces supported on tombstone fixtures. The present invention provides such an apparatus.

SUMMARY OF THE INVENTION

It is, therefore, an object of the present invention to provide a workpiece support assembly including an indexing unit adapted for the automated adjustment of a workpiece being machined. The assembly includes a central support column having at least one indexing unit secured thereto. The indexing unit includes a base member integrated with the central support column, a main body to which a workpiece may be selectively secured and a locking assembly permitting the selective locking and rotation of the main body relative to the base member. The main body is mounted on the base member for selective rotation required to rotate a workpiece as mounted.

It is also an object of the present invention to provide an assembly wherein the locking assembly is resiliently biased to selectively lock the base member and the main body in desired positions.

It is another object of the present invention to provide an assembly wherein the locking assembly includes relatively moveable inner and outer gear rings which are respectively linked to the base member and main body. The inner and outer gear rings are selectively engaged to prevent relative motion therebetween and thereby prevent relative motion between the base member and the main body.

It is a further object of the present invention to provide an assembly wherein a lock gear selectively engages the inner and outer rings to prevent relative motion therebetween.

It is also another object of the present invention to provide an assembly wherein the lock gear is spring biased into engagement with the inner and outer gear rings.

It is yet a further object of the present invention to provide an assembly including a lift arm which acts upon the lock gear to selectively move the lock gear from engagement with the inner and outer gear rings.

It is still another object of the present invention to provide an assembly including a pressure plate positioned between the main body and the lock gear for applying a spring bias forcing the lock gear into engagement with the inner and outer gear rings.

It is also an object of the present invention to provide an assembly wherein the central support column includes eight indexing assemblies secured thereto.

It is a further object of the present invention to provide an assembly wherein the indexing assembly is releasably secured to the central support column.

It is another object of the present invention to provide an indexing assembly as described above.

It is yet another object of the present invention to provide a locking assembly adapted to selectively locking rotating members relative to each other. The locking assembly includes relatively moveable inner and outer gear rings respectively coupled to a base member and a main body. The inner and outer gear rings are selectively engaged by a lock gear to prevent relative motion therebetween and thereby prevent relative motion between the base member and the main body. The lock gear flexes in a controlled manner such that it engages the inner and outer rings at different times.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
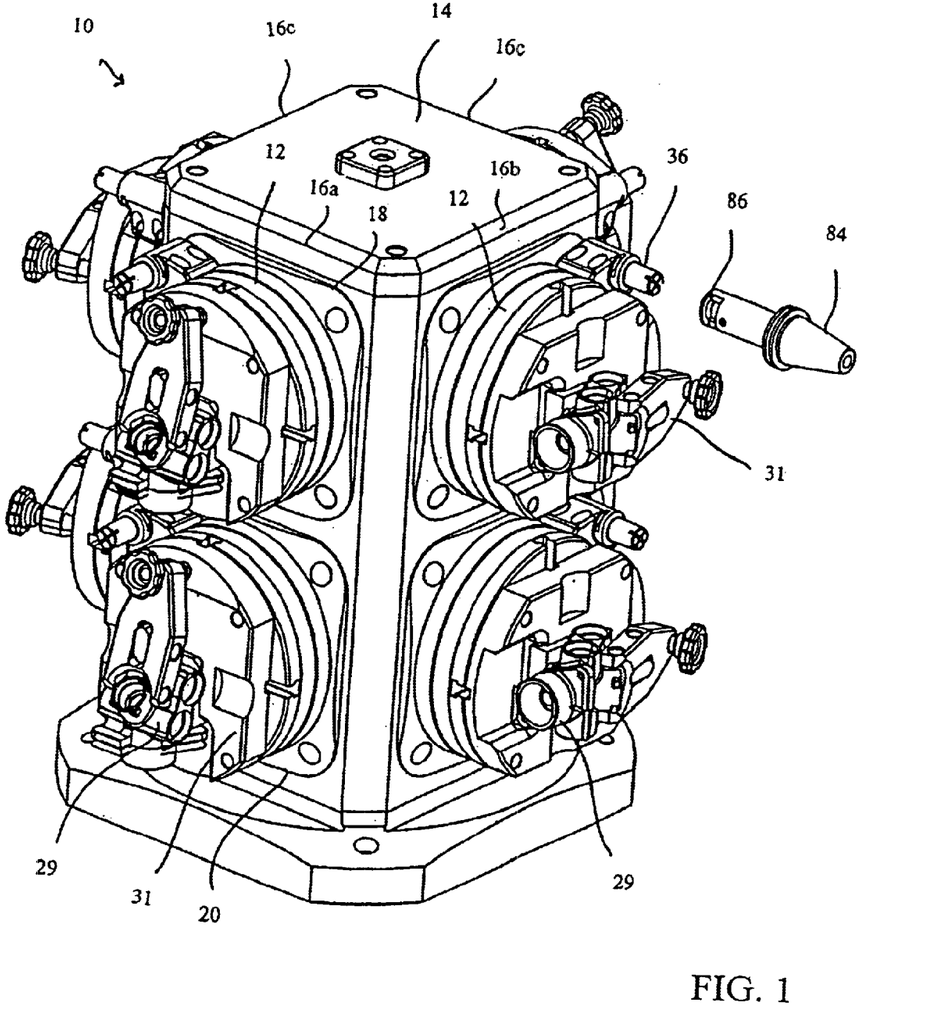
FIG. 1 is a perspective view of a tombstone including the present indexing units.

With reference to FIG. 1, a tombstone-style machine tool fixture, or workpiece support assembly, 10 is disclosed. The tombstone fixture 10 includes a plurality of indexing units 12 adapted for the automated adjustment of a workpiece being machined.

The tombstone fixture 10 includes a central support column 14. The central support column 14 is constructed for mounting upon a turntable (not shown) in a manner well known to those skilled in the art. In this way, the tombstone fixture 10 may be selectively rotated to bring mounted workpieces into, and out of, contact with machining elements. In fact, the central support column 14 is preferably constructed with four faces 16a–d adapted to support the plurality of indexing units 12 mounted thereto. In this way, one face is positioned for contact with the machining elements, while the remaining three faces are oriented for access by those individuals operating a machining assembly incorporating the present tombstone fixture 10. While a four faced support central column is disclosed in accordance with a preferred embodiment of the present invention, the central support column may be manufactured in a variety of shapes without departing from the spirit of the present invention.

In accordance with a preferred embodiment of the present invention, each face of the support column 14 is formed with first and second recess 18, 20 each shaped and dimensioned to receive a single indexing unit 12. As such, the disclosed tombstone fixture 10 is adapted for the receipt of up to eight indexing units 12, each adapted to support a single workpiece.

Referring to FIGS. 2 to 8, each of the indexing units 12 includes a base member 22 coupled to the central support column 14, a main body 24 rotatably mounted on the base member 22 for selective rotation required to rotate a workpiece mounted thereon and a locking assembly 26 positioned between the base member 22 and the main body 24 for selectively controlling the position of the main body 24 relative to the base member 22. The base member 22 is preferably bolted to the support column 14 within one of the recesses 18, 20. The base member 22 may, therefore, be selectively removed if an operator so wishes.

The base member 22 includes a central, outwardly facing recess 28 shaped and dimensioned for receipt of the main body 24 and the locking assembly 26 positioned between the base member 22 and the main body 24. With reference to FIGS. 1, 2, 3, 6, 7 and 8, the main body 24 includes an outer surface 30 shaped and dimensioned to facilitate the selective attachment of a workpiece 29 thereto through the use of various coupling members, or workholding fixtures, 31.

As briefly mentioned above, the locking assembly 26 is positioned between the base member 22 and the main body 24. The locking assembly 26 includes an inner gear ring 32 fixedly mounted to the base member 22 and an outer gear ring 34 fixedly coupled to the main body 24 for rotation therewith. Relative movement between inner gear ring 32 and the outer gear ring 34 is controlled to permit the selective movement of the main body 24 relative to the base member 22 for controlled indexing of a workpiece or fixture mounted on the outer surface 30 of the main body 24. The inner and outer gear rings 32, 34 provide a robust locking assembly fully capable of handling the vast pressures applied during conventional machining processes.

Selective movement of the outer gear ring 34 relative to the inner gear ring 32, permitting the selective locking and unlocking of the base member 22 and main body 24, is controlled by the other components making up the locking assembly 26. With this in mind, the locking assembly 26 further includes a spring biased plunger 36 accessible from the exterior of the main body 24. The plunger 36 interacts with a lock gear lift arm 38 of a lock gear 40 to selectively move the lock gear 40 into and out of engagement with the outer gear ring 34 and inner gear ring 32 to thereby control relative movement between the inner and outer gear rings 32, 34.

Figure 7:
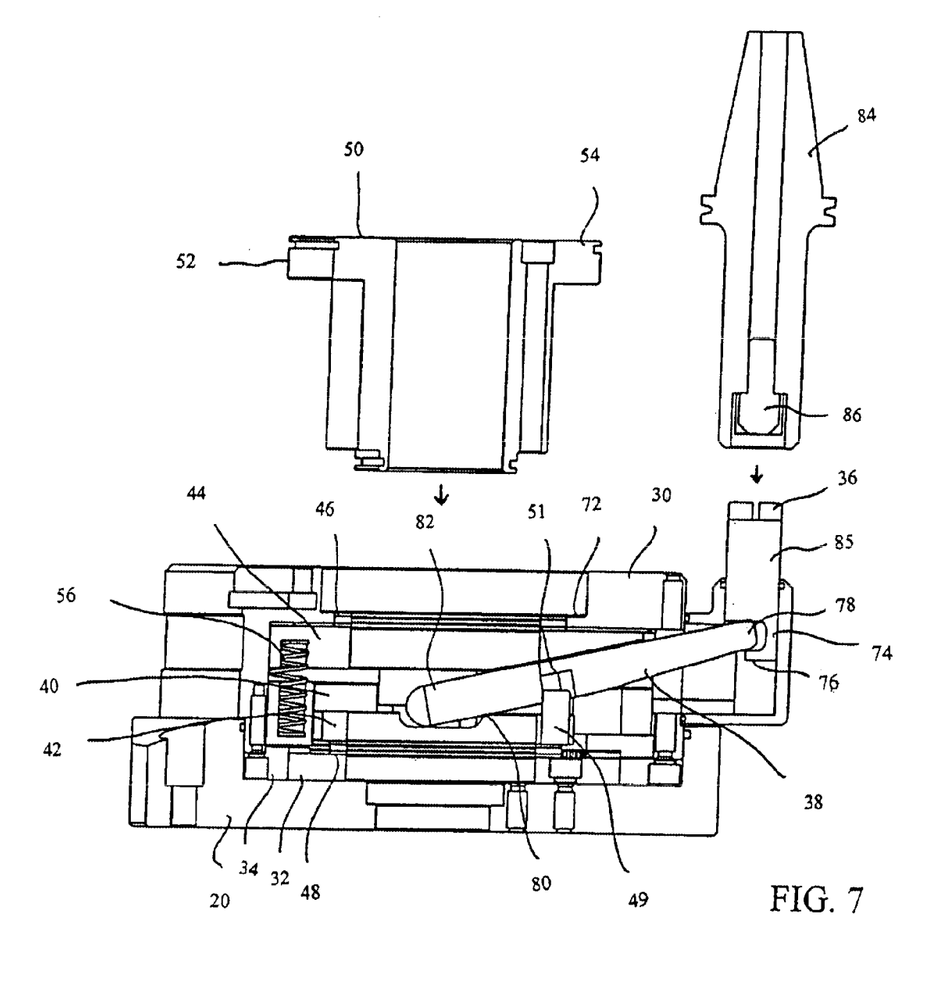
FIG. 7 is a cross sectional view across the diameter of the indexing unit when locked in position.

When the lock gear 40 is engaged with the inner and outer gear rings 32, 34, the indexing unit 12 is locked and the main body 24 may not move relative the base member 22 (see FIG. 7). However, when the lock gear 40 is withdrawn from engagement with the inner and outer gear rings 32, 34, the indexing unit 12 is unlocked and the main body 24 is free to move relative to the base member 22 (see FIG. 8).

Figure 2:
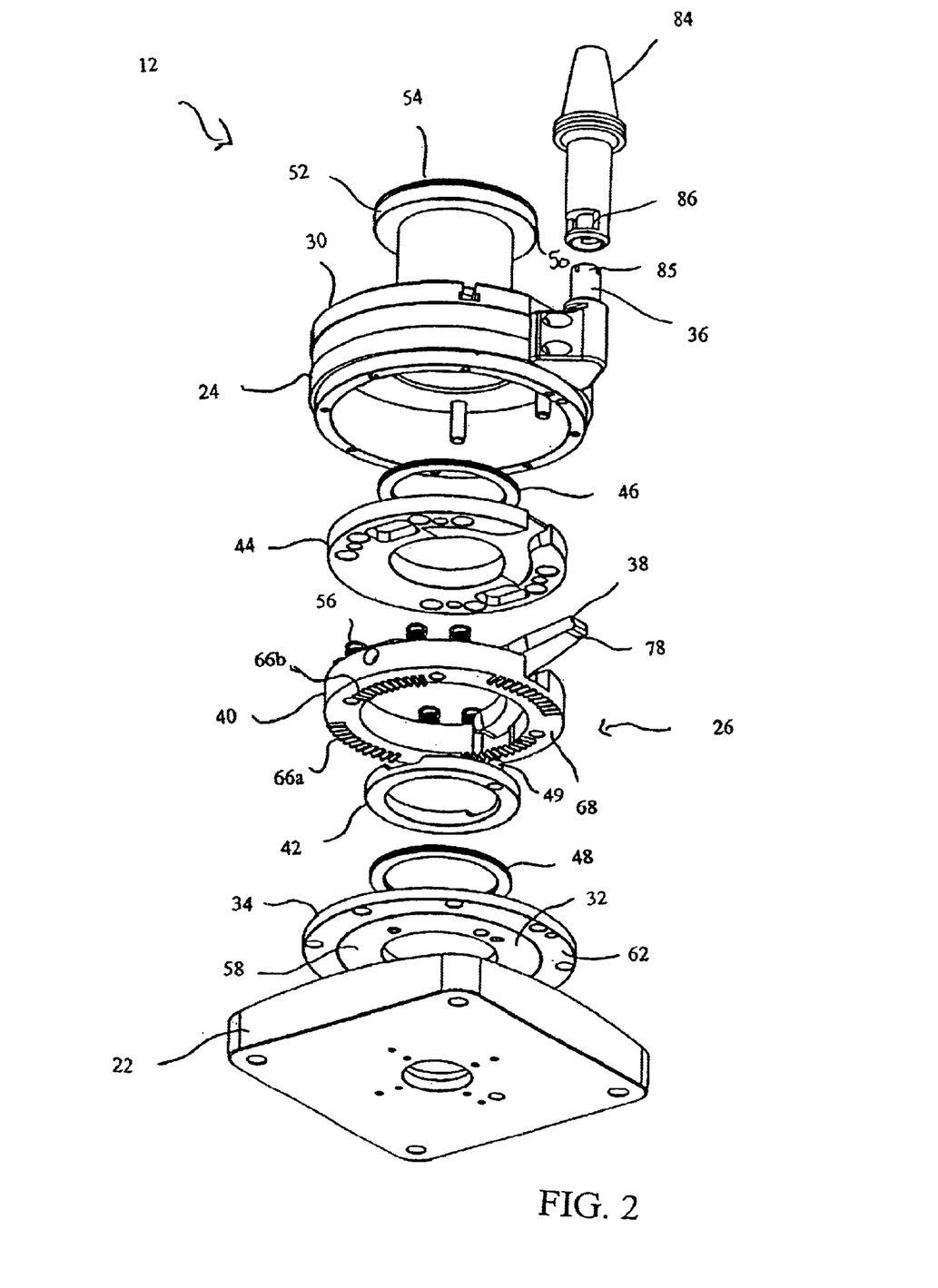
FIG. 2 is an exploded bottom perspective view of the indexing unit in accordance with the present invention.
Figure 3:
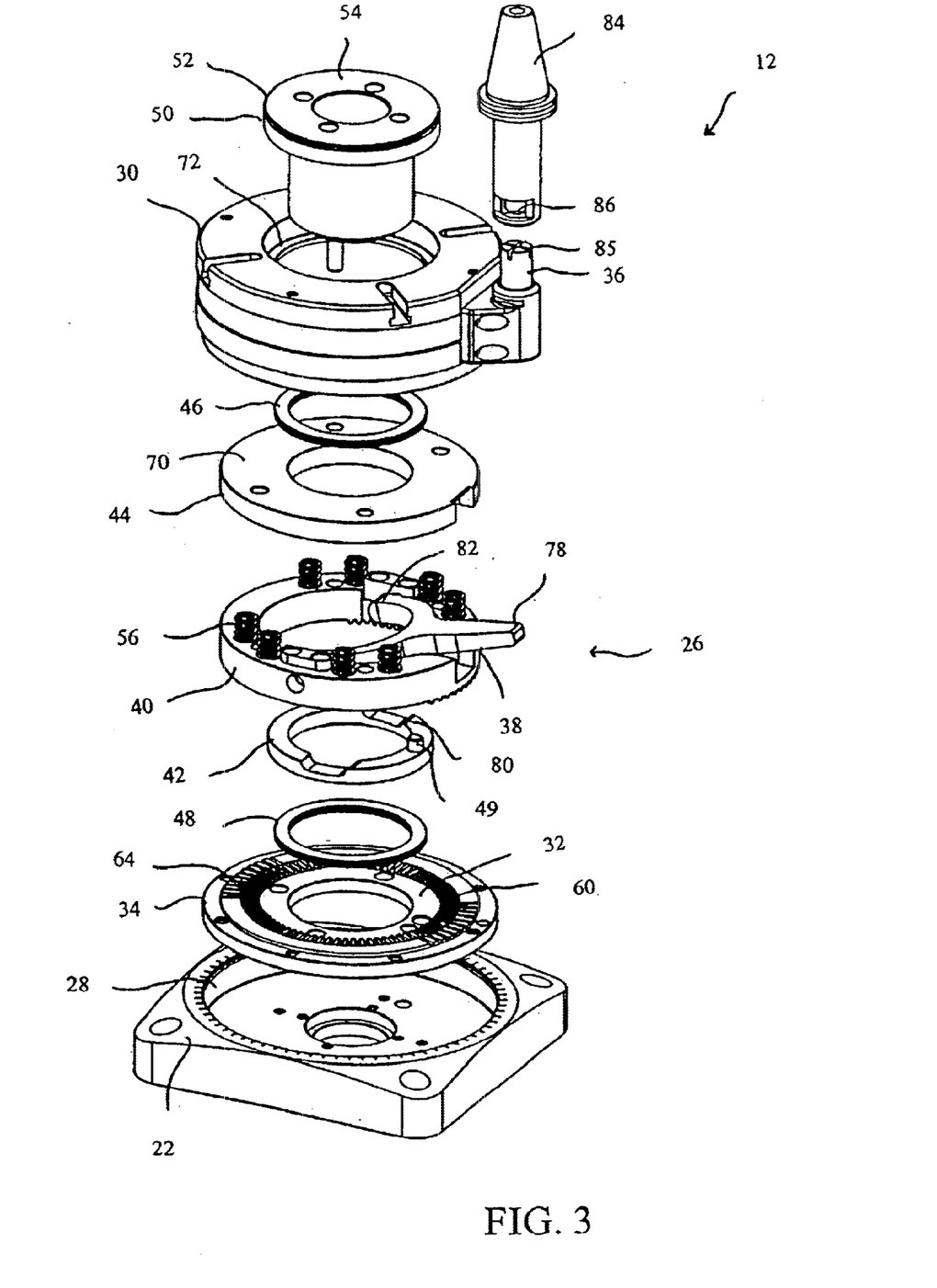
FIG. 3 is an exploded top view perspective view of the indexing unit in accordance with the present invention.
Figure 4:
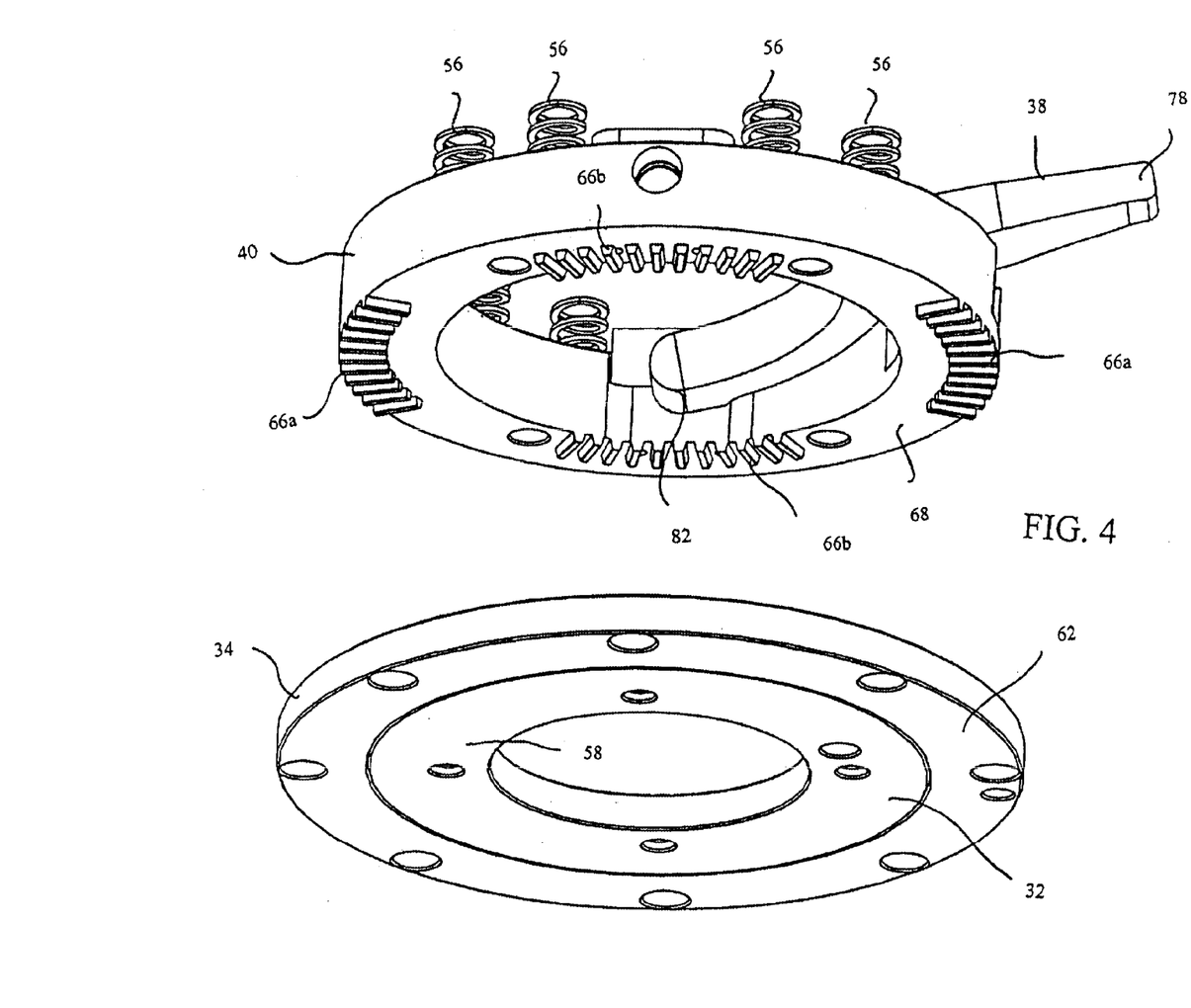
FIG. 4 is a detailed bottom perspective view of the lock gear and inner and outer gear rings.
Figure 5:
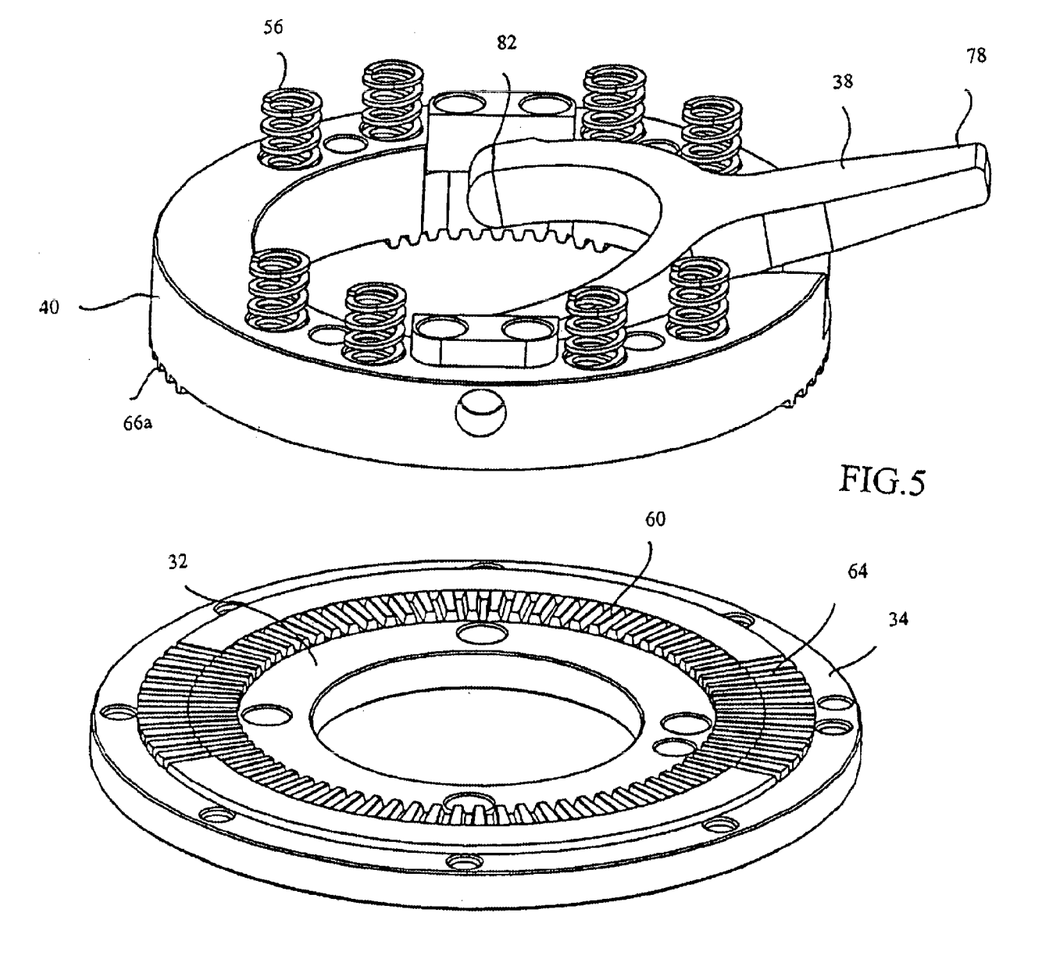
FIG. 5 is a detailed top perspective view of the lock gear and inner and outer gear rings.

With reference to FIGS. 2 to 4, the inner gear ring 32 is an annular member adapted for fixed attachment to the central support column 14 in a manner discussed below in greater detail. The inner gear ring 32 includes a substantially smooth outwardly facing surface 58 which faces the base member 22 and a grooved inwardly facing surface 60 which faces the lock gear 40.

The outer gear ring 34 is an annular member which fits about the inner gear ring 32. With this in mind, the outer gear ring 34 has an inner diameter which is slightly larger than the outer diameter of the inner gear ring 32. The outer gear ring 34 is mounted to the main body 24 via bolts for rotation therewith. As with the inner gear ring 32, the outer gear ring 34 includes a substantially smooth outwardly facing surface 62 which faces the base member 22 and a grooved inwardly facing surface 64 which faces the lock gear 40.

The grooves applied to the inwardly facing surfaces 60, 64 of the inner and outer gear rings 32, 34 may take a variety of forms within the spirit of the present invention so long as they are shaped to create a locking arrangement with grooves 66a, 66b formed along the inwardly facing surface 68 of the lock gear 40. Extending from the base member 22 to the main body 24, the locking assembly 26 includes a lift arm pivot base 42, a lock gear 40 and a pressure plate 44. As will be discussed below in greater detail, first and second thrust bearings 46, 48 are respectively associated with the lift arm pivot base 42 and the pressure plate 44 to ensure proper rotation of the indexing unit 12. In addition, the lift arm pivot base 42 includes an indexing pin 49 shaped and dimensioned to fit within a recess 51 formed in the lock gear lift arm 38 for maintaining the desired orientation of the lift arm pivot base 42 relative to the lock gear 40.

The central components of the indexing unit 12, that is, the main body 24, pressure plate 44, lock gear 40, lift arm pivot base 42 and the inner and outer ring gears 32, 34 are supported on an axle 50. The axle 50 extends from the main body 24 to the base member 22 where it is fixedly mounted in a stationary position. As a result, the central components are retained between the outwardly extending flange 52 at the distal end 54 of the axle 50 and the base member 22.

The pressure plate 44 is coupled to the lock gear 40 and the main body 24 for rotation therewith. The outwardly extending flange 52 of the axle 50 acts upon the outwardly facing side 70 of the pressure plate 44 and an inwardly facing flange 72 of the main body 24 to support the pressure plate 44 as it applies inward pressure on the lock gear 40.

The first thrust bearing 46 is positioned between the pressure plate 44 and the axle 50 to provide clearance between the main body 24 and the pressure plate 44. This ensures free rotation of the central components despite the interaction between the pressure plate 44 and the axle 50.

In practice, and with the lock gear 40 engaging the inner and outer gear rings 32, 34 (see FIG. 7), the pressure plate 44 includes a series of springs 56 which biases the lock gear 40 into engagement with the inner and outer gear rings 32, 34. The lock gear 40 generally "marries" the inner and outer gear rings 32, 34 into a locked arrangement where they are prevented from moving relative to each other. While springs are discloses for biasing the pressure plate 44 in accordance with a preferred embodiment of the present invention, various biasing mechanisms may be used without departing from the spirit of the present invention.

When the pressure plate 44 has forced the lock gear 40 into engagement with the inner and outer gear rings 32, 34, the main body 24 is prevented from moving relative to the base member 22. That is, the lock gear 40, outer gear ring 34 and main body 24 are coupled to move in unison. As such, when the lock gear 40 marries the inner and outer gear rings 32, 34, the rigid attachment of the inner gear ring 32 to the base member 22 prevents the outer ring 34, and ultimately the main body 24, from moving.

When it is desired to rotate the main body 24, the plunger 36 is pushed inwardly to force the lock gear 40 out of engagement with the inner and outer gear rings 32, 34 (see FIG. 8), and permit free rotation of the outer gear ring 34 relative to the inner gear ring 32. Specifically, the distal end 74 of the plunger 36 extends toward, and is coupled to, the lock gear lift arm 38 of the lock gear 40. The plunger 36 includes a recess 76 shaped and dimensioned for engagement with the free end 78 of the lock gear lift arm 38.

When the plunger 36 is pressed inwardly toward the lock gear 40, the lock gear lift arm 38 is caused to move toward the inner and outer gear rings 32, 34. This movement forces the lock gear lift arm 38 into contact with the fulcrum member 80 of the lift arm pivot base 42. Continued inward pressure by the plunger 36 causes the lock gear 40 to move from the inner and outer gear rings 32, 34, releasing the gear rings 32, 34 and permitting relative motion therebetween. The main body 24 is then free to rotate as required by the machining process.

The leverage controlling the movement of the lock gear lift arm 38, and the associated lock gear 40, works on a 4:1 ratio. While specific dimensions and ratios are disclosed above with reference to a preferred embodiment of the present invention, the ratios may be varied to suit specific applications without departing from the spirit of the present invention.

Figure 6:
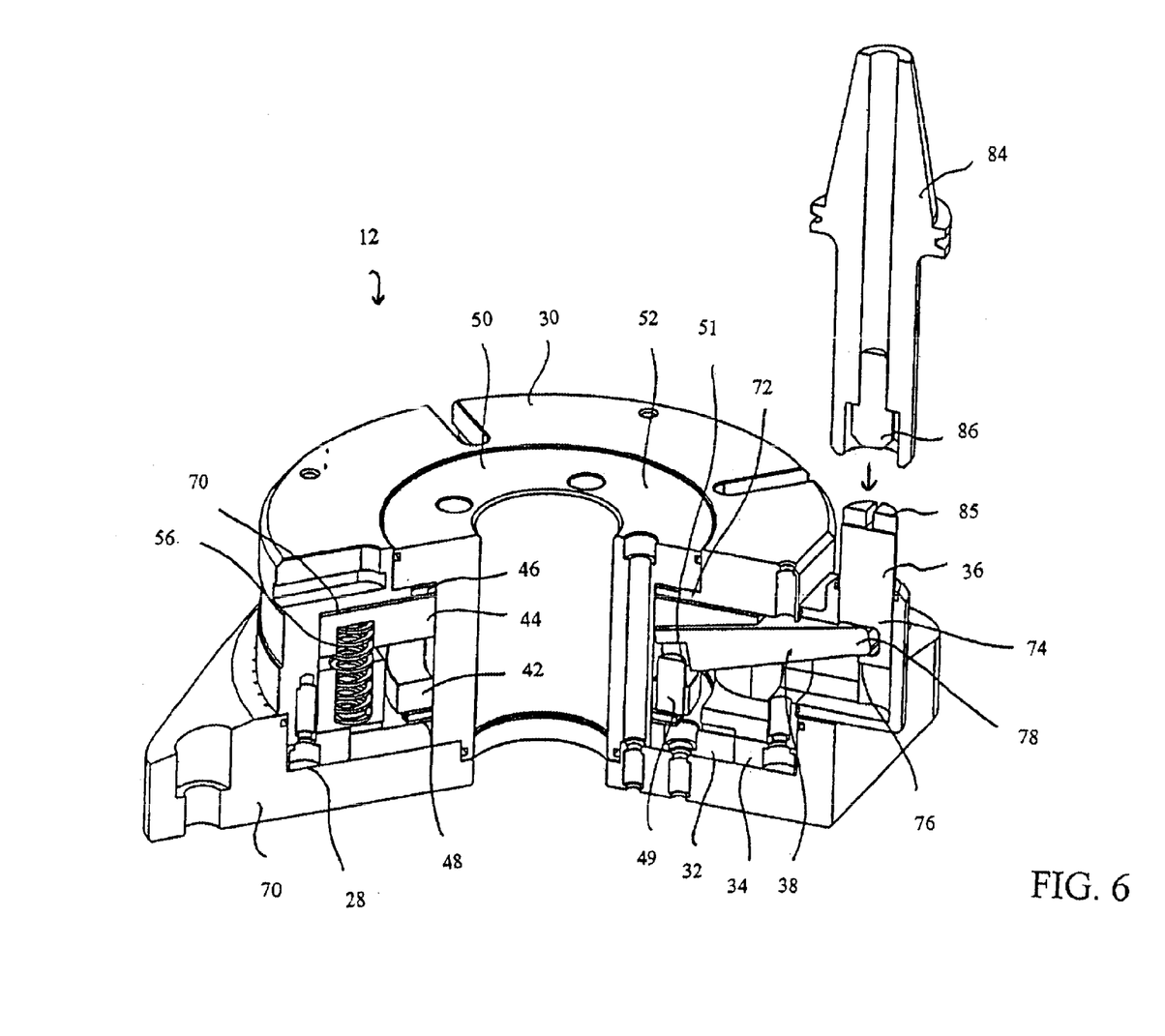
FIG. 6 is a cross sectional view of the indexing unit locked in positioned.
Figure 8:
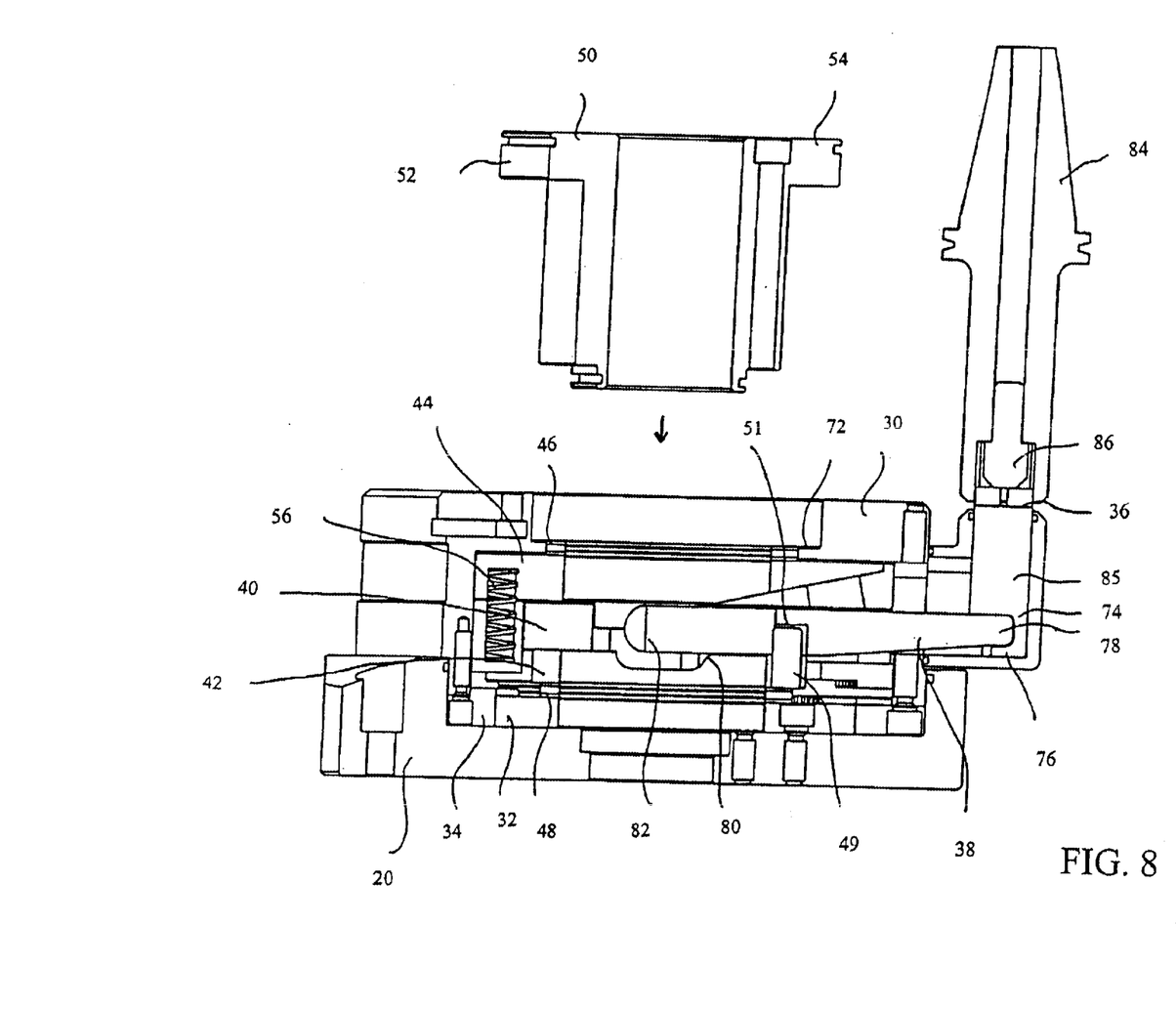
FIG. 8 is a cross sectional view across the diameter of the indexing unit when in a released position.

Specifically, and with reference to FIGS. 6, 7 and 8, the lock gear lift arm 38 works as a lever with the leverage point being the fulcrum member 80 at which the lock gear lift arm 38 acts upon the lift arm pivot base 42. As those skilled in the art will readily appreciate, the distance from the fulcrum member 80 to the free end 78 of the lock gear lift arm 38, where the plunger 36 acts on the lock gear lift arm 38, is approximately 4 inches in accordance with a preferred embodiment of the present invention, and the distance from the fulcrum member 80 to the second end 82 of the lock gear lift arm 38 where the lift arm 38 is pivotally coupled to the lock gear 40 is approximately 1 inch. This creates approximately a 4:1 leverage ratio effectively decreasing the pressure which must be applied by the plunger 36 to overcome the pressure applied by the spring bias of the pressure plate 44.

The lift arm pivot base 42 is coupled to the lock gear 40 for rotation therewith. The lift arm pivot base 42 is in contact with the central surface of the inner gear ring 32 as a result of the substantial spring bias generated by the pressure plate 44 in forcing the lock gear into contact with the inner and outer gear rings 32, 34. A second thrust bearing 48 is, therefore, positioned between the lift arm pivot base 42 and the inner gear ring 32 to ensure free rotation between the lift arm pivot base 42 and the inner gear ring 32 when the main body 24 is rotated.

As the lock gear 40 is released to permit engagement of the respective inner and outer gears 32, 34, the lock gear is constructed in a manner creating a controlled flex which permits locking of the assembly even when the grooves 66a, 66b of the lock gear 40 are not exactly aligned with the respective inner and outer gears 32, 34. The lock gear 40 is specifically constructed such that the ends most removed from the second end 82 of the lock gear lift arm 38, that is, the ends where the groove segments 66a are formed in the lock gear, flex upon the application of pressure. Flexing of the lock gear 40 is further defined by concentrating the springs 56 above the grooves 66b.

The flex of the lock gear 40, when combined with the positioning of the arcuate groove segments 66a, 66b along the lock gear 40, advantageously directs the groove segments 66a into engagement with the outer gear 34 before the groove segments 66b engage the inner gear 32. Because the lock segment 40 engages the outer gear 34 along the limited segments defined by the groove segments 66a before the inner gear 32 engages the limited segments defined by the groove segments 66b, slight positioning differences which might have cause alignment problems not longer represent a problem.

In use, a workpiece is mounted upon the main body 24 of the indexing unit 12 in the manner discussed above, or in a variety of ways in which those skilled in the art will readily appreciate. The tombstone fixture 10 is rotated until such a time that the face upon which the workpiece is mounted faces the machining tool. At this time, the machining tool works through a programmed array using various tools to fabricate a desired product.

If at any time during the machining process, it becomes necessary to rotate the workpiece to continue the machining process, the indexing unit 12 may be acted upon to permit selective rotation of the workpiece mounted thereon. Specifically, the spindle of the machining apparatus is programmed to retrieve a tool 84 shaped and dimensioned for receipt by the proximal end 85 of the plunger 36. The tool 84 is an elongated member having a recess 86 shaped and dimensioned for receiving the proximal end 85 of the plunger 36. In this way, the tool 84 may be retrieved by the machining apparatus, positioned over the plunger 36 and forced toward the central support column 14 until the inner and outer gear rings 32, 34 are unlocked in the manner discussed above. The tool 84 is formed with grooves adapted to resist the negative effects of chip removal.

The machining apparatus then rotates the main body 24, as well as the workpiece mounted thereon, to a predetermined position. Further machining is then performed.

While a preferred embodiment described above includes a distinctly formed base member, the base member may be integrally formed with the central support column. Similarly, it is contemplated that the appropriate applications for the indexing unit extend beyond the tombstone fixture discussed above, and the indexing unit may be used apart from the central support column without departing from the spirit of the present invention.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An indexing assembly adapted for use with a workpiece support assembly, comprising:
   a base member adapted for integration with a workpiece support assembly;
   a main body to which a workpiece may be selectively secured, the main body being mounted on the base member for selective rotation required to rotate a workpiece as mounted;
   a locking assembly permitting the selective locking and rotation of the main body relative to the base member;
   wherein the locking assembly includes relatively moveable inner and outer gear rings which are respectively linked to the base member and main body, the inner and outer gear rings being selectively engaged to prevent relative motion therebetween and thereby prevent relative motion between the base member and the main body.

2. A workpiece support assembly including an indexing unit adapted for the automated adjustment of a workpiece being machined, comprising:
   a central support column having at least one indexing unit secured thereto;
   the indexing unit including:
      a base member integrated with the central support column;
      a main body to which a workpiece may be selectively secured, the main body being mounted on the base member for selective rotation required to rotate a workpiece as mounted; and
      a locking assembly permitting the selective locking and rotation of the main body relative to the base member,
   wherein the locking assembly includes relatively moveable inner and outer gear rings which are respectively linked to the base member and main body, the inner and outer gear rings being selectively engaged to prevent relative motion therebetween and thereby prevent relative motion between the base member and the main body.

3. The workpiece support assembly according to claim 2, wherein the locking assembly includes resilient biasing means for selectively locking the base member and the main body in desired positions.

4. The workpiece support assembly according to claim 2, wherein a lock gear selectively engages the inner and outer rings to prevent relative motion therebetween.

5. The workpiece support assembly according to claim 4, wherein the lock gear is spring biased into engagement with the inner and outer gear rings.

6. The workpiece support assembly according to claim 5, further including a lift arm which acts upon the lock gear to selectively move the lock gear from engagement with the inner and outer gear rings.

7. The workpiece support assembly according to claim 5, further including a pressure plate positioned between the main body and the lock gear for applying a spring bias forcing the lock gear into engagement with the inner and outer gear rings.

8. The workpiece support assembly according to claim 4, further including a lift arm which acts upon the lock gear to selectively move the lock gear from engagement with the inner and outer gear rings.

9. The workpiece support assembly according to claim 2, wherein the central support column includes 8 indexing assemblies secured thereto.

10. The workpiece support assembly according to claim 2, wherein the indexing assembly is releasably secured to the central support column.

11. The indexing assembly according to claim 1, further including means for selective attachment to a workpiece support assembly.

12. The indexing assembly according to claim 1, wherein the locking assembly includes resilient biasing means for selectively locking the base member and the main body in desired positions.

13. The indexing assembly according to claim 1, wherein a lock gear selectively engages the inner and outer rings to prevent relative motion therebetween.

14. The indexing assembly according to claim, 13, further including a lift arm which acts upon the lock gear to selectively move the lock gear from engagement with the inner and outer gear rings.

15. The indexing assembly according to claim 13, wherein the lock gear is spring biased into engagement with the inner and outer gear rings.

16. The indexing assembly according to claim 15, further including a lift arm which acts upon the lock gear to selectively move the lock gear from engagement with the inner and outer gear rings.

17. The indexing assembly according to claim 15, further including a pressure plate positioned between the main body and the lock gear for applying a spring bias forcing the lock gear into engagement with the inner and outer gear rings.

* * * * *